No. 894,842. PATENTED AUG. 4, 1908.
R. L. LOWRY.
FLEXIBLE COUPLING.
APPLICATION FILED JAN. 18, 1907.

Witnesses
J. P. Britt
E. C. Duffy

Inventor
R. L. Lowry
By
Attorneys

UNITED STATES PATENT OFFICE.

ROBERT LEE LOWRY, OF LOUISVILLE, KENTUCKY, ASSIGNOR OF ONE-HALF TO HARRY B. DRIVER, OF LOUISVILLE, KENTUCKY.

FLEXIBLE COUPLING.

No. 894,842.     Specification of Letters Patent.     Patented Aug. 4, 1908.

Application filed January 18, 1907. Serial No. 352,899.

*To all whom it may concern:*

Be it known that I, ROBERT LEE LOWRY, a citizen of the United States, residing at Louisville, in the county of Jefferson and State of Kentucky, have invented certain new and useful Improvements in Flexible Couplings; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.
My invention relates to flexible couplings, and has for its object to provide a device of this class whereby two shafts can be coupled together even though they be slightly out of alinement, or one be at a slight angle to the other.

With these objects in view my invention consists in the novel construction and arrangement of the flexible connecting straps or links, and my invention also consists in the combination of the straps or links with the coupling members all of which will be first fully described and afterwards specifically pointed out in the appended claims.

Figure 1:
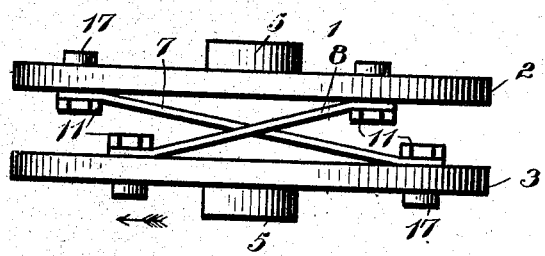
Figure 2:
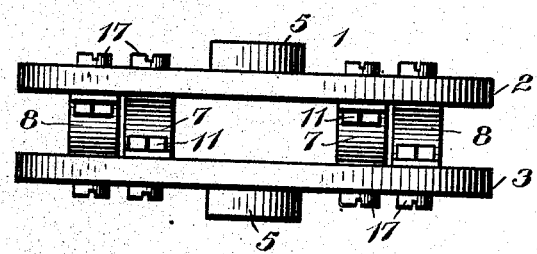

Referring to the accompanying drawing:
Figure 1 is a side elevation of the coupling. Fig. 2 is a side elevation looking endwise on to the connecting straps or links, and, Fig. 3 is a plan view of the coupling, the upper coupling member being shown transparent in order to illustrate the location and arrangement of the coupling straps or links.

Like numerals of reference indicate the same parts throughout the several figures, in which, 1 indicates the coupling comprising two coupling members 2 and 3, and for convenience the coupling member 2 will be termed the driving member and coupling member 3 the driven member, which coupling member comprises preferably a disk 4 having a sleeve or collar 5 and a central opening 6 to receive the shaft.

7 and 8 indicate the flexible connecting straps or links which may be constructed of any suitable flexible material such as leather, canvas, rubber, cable, etc. As shown in Fig. 3 the connecting straps 7 are longer than the straps 8 and are disposed on the coupling members intermediate the straps 8 and closer to the center of the coupling members all of said straps or links being arranged at substantially right angles to the axis of the coupling members as shown in Figs. 1 and 3.

Figure 3:
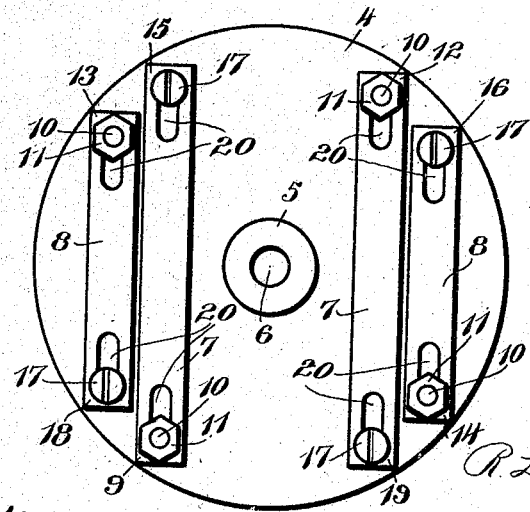

Considering the disk 4, shown in Fig. 3 as being the lower or driven member 3, it will be seen that the lower end 9 of one of the connecting straps or links 7 is bolted to the disk 4 by means of a bolt 10 and nut 11; while the upper end 12 of the other connecting strap or link 7 is also secured to the disk 4 by means of a bolt 10 and nut 11.

Referring now to the shorter connecting straps or links 8 it will be seen that the upper end 13 is secured to the disk 4 by means of a bolt 10 and nut 11; while the lower end 14 of the other short strap or link 8 is secured to the disk 4 by means of a bolt 10 and nut 11; while the upper ends 15 and 16 of one of the long links 7 and short links 8 are bolted to the upper or driving member 2 by means of bolts 17, while the lower ends 18 and 19 of one of the short straps 8 and long straps 7 are bolted to the upper or driving member 2 by means of bolts 17. The effect of this construction is that all of the connecting straps instead of being at right angles to each other or angularly disposed to each other, are parallel, and each pair of connecting straps or links on both sides of the disks are parallel to each other, as illustrated in Fig. 1.

Having thus fully described the several parts of my invention its operation is as follows: The coupling members 2 and 3 being secured to their shafts the longer links 7 are brought into operation when the driven member 3 is being rotated in the direction of the arrow in Fig. 1; while the shorter links 8 are brought into operation when the driven member 3 is being rotated in the direction opposite to the arrow.

Having thus fully described the several parts of my invention, what I claim as new and desire to secure by Letters Patent of the United States, is,

A flexible coupling comprising a driving member, a driven member, a series of flexible links or straps connecting said members, said links or straps being arranged in pairs, the outer strap or link of each pair having one end secured to the driving member and its other end secured to the driven member, the inner strap or link of each pair having its ends secured to the coupling members reversely to those of the outer strap or link in such manner that the straps or links of each pair cross each other.

In testimony whereof, I affix my signature, in presence of two witnesses.

ROBERT LEE LOWRY.

Witnesses:
EMMA J. PATILLO,
WALTER RATCLIFFE.